United States Patent [19]
Olshansky et al.

[11] Patent Number: 5,134,509
[45] Date of Patent: * Jul. 28, 1992

[54] COHERENT SUBCARRIER MULTIPLEXED OPTICAL COMMUNICATION SYSTEM

[75] Inventors: Robert Olshansky, Wayland; Richard W. Gross, Arlington, both of Mass.

[73] Assignee: GTE Laboratories Incorporated, Waltham, Mass.

[*] Notice: The portion of the term of this patent subsequent to Jan. 29, 2008 has been disclaimed.

[21] Appl. No.: 546,041

[22] Filed: Jun. 28, 1990

Related U.S. Application Data

[63] Continuation-in-part of Ser. No. 289,009, Dec. 22, 1988, Pat. No. 4,989,200.

[51] Int. Cl.⁵ .................. H04J 14/02; H04B 10/06
[52] U.S. Cl. ..................................... 359/132; 359/192
[58] Field of Search ............... 455/601, 606, 607, 609, 455/610, 611, 612, 613, 617–619; 370/3; 359/132, 192

[56] References Cited

U.S. PATENT DOCUMENTS

| | | | |
|---|---|---|---|
| 4,553,101 | 11/1985 | Mathis | 329/50 |
| 4,677,618 | 6/1987 | Haas et al. | 371/1 |
| 4,701,904 | 10/1987 | Darcie | 370/3 |
| 4,768,186 | 8/1988 | Bodell | 370/3 |
| 4,893,300 | 1/1990 | Carlin et al. | 370/3 |
| 4,989,200 | 1/1991 | Olshansky et al. | 370/3 |

FOREIGN PATENT DOCUMENTS

| | | | |
|---|---|---|---|
| 112652 | 10/1978 | Japan | 455/601 |
| 043231 | 2/1987 | Japan | 455/608 |
| 141828 | 6/1987 | Japan | 455/619 |

OTHER PUBLICATIONS

R. B. Lauer, SPIE, vol. 756, Optical Technologies for Space Communication Systems, 1987, pp. 136–141, Jan. 1987.
R. Olshansky et al, IEEE Journal of Quantum Electronics, vol. QE-23, No, 9, Sep. 1987, pp. 1410–1418.
J. Bowers, Electronics Letters, vol. 22, pp. 1119–1121 (Aug. 1986).
Mendis et al, Electronics Letters, vol. 24, No. 7, pp. 442–443 (Mar. 31, 1988).
J. Salz, IEEE Communications Magazine, vol. 24, No. 6, Jun. 1986, pp. 38–49.
Okoshi, Journal of Lightwave Techn., vol. LT-3, No. 6, Dec. 1985, pp. 1232–1237.
Deichmiller, "Progress in Fiber Optics Transmission Systems for Cable Television", IEEE Trans. CATV, CATV-5, No. Apr. 1980, pp. 50–59.

Primary Examiner—Reinhard J. Eisenzopf
Assistant Examiner—L. Pascal
Attorney, Agent, or Firm—Wolf, Greenfield & Sacks

[57] ABSTRACT

An optical communication system includes a transmitter for generating a subcarrier multiplexed optical signal, a receiver and an optical fiber for coupling the optical signal from the transmitter to the receiver. At the transmitter, an optical carrier is modulated with a composite modulation signal including a plurality of modulated microwave subcarriers to provide the optical signal. The receiver includes a local oscillator for generating a local light beam, a detector responsive to the received optical signal and the local light beam for providing a detected signal at an intermediate frequency, and a microwave receiver for demodulating the microwave subcarriers from the detected signal. The modulation index of the optical signal produced by each of the modulated microwave subcarriers is selected to permit transmission of a large number of high quality video channels. A quadrature detector can be used to eliminate second-order intermodulation products. The quadrature detector can also be used to eliminate optical phase noise.

6 Claims, 4 Drawing Sheets

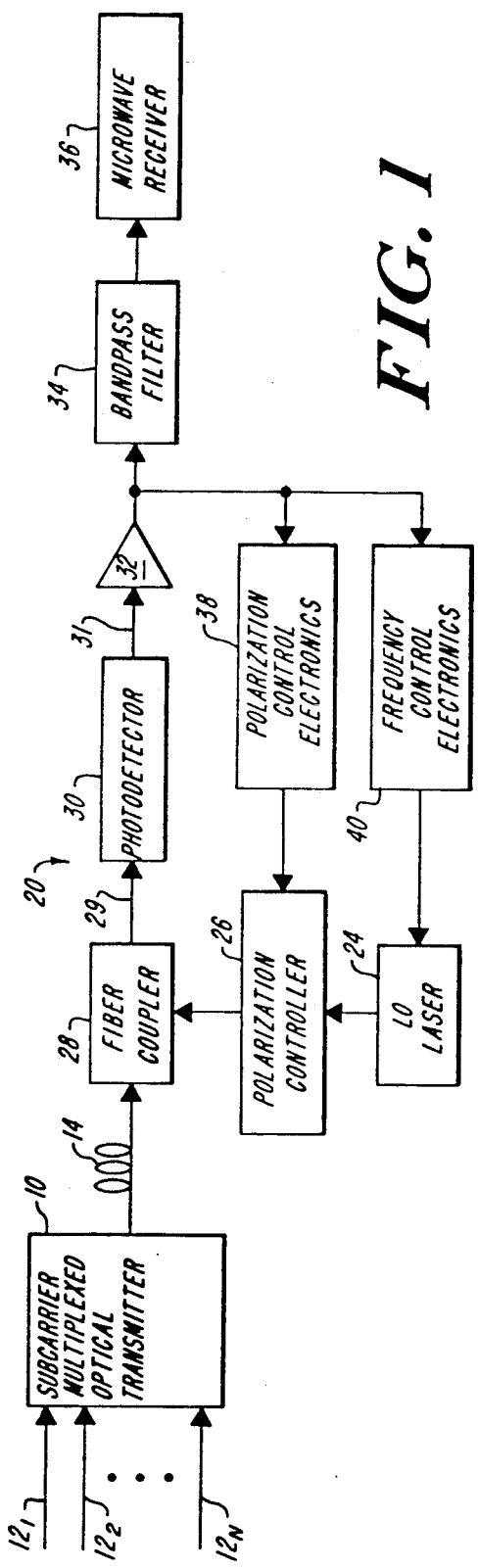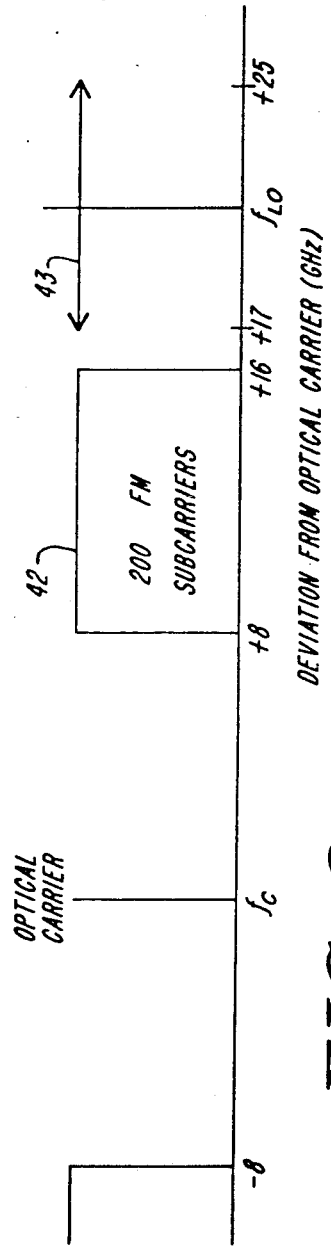

COHERENT SUBCARRIER MULTIPLEXED OPTICAL COMMUNICATION SYSTEM

CROSS REFERENCE TO RELATED APPLICATION

This application is a continuation-in-part of application Ser. No. 289,009 now U.S. Pat. No. 4,989,200 filed Dec. 22, 1988.

FIELD OF THE INVENTION

This invention relates to optical communication systems wherein a light beam is modulated by a plurality of microwave subcarriers and, more particularly, to coherent optical communication systems wherein the received subcarrier multiplexed optical signal is mixed with a local oscillator light beam for improved system performance.

BACKGROUND OF THE INVENTION

Optical fiber transmission systems are being extensively used in the telephone network for long distance and interoffice trunk lines because of their wide bandwidth, small size and insensitivity to electrical interference. Conventional long distance optical transmission systems utilize time division multiplexed digital transmission. The maximum data rate available in commercial lightwave systems was for many years limited to 565 megabits per second, and has only recently been increased to 1.7 gigabits per second. A 565 megabits per second optical trunk line carrying 8,000 voice channels is very cost effective for voice transmission.

Recently, efforts have been made in the telecommunications industry to utilize optical transmission systems in the local, or subscriber, loop between the central office and individual subscribers. The goal is to provide not only voice, but also data and video transmission over the optical fiber to every home and business. The video services are expected to include not only broadcast services, but also switched video services which will enable each subscriber to select programming and movies from video libraries. An uncompressed digital video signal requires a data rate of about 100 megabits per second, and analog FM video requires a bandwidth of about 30 megahertz. As a result, the 565 megabit per second system, which is so effective for carrying voice channels, carries only a few video channels and must be supplemented with extensive video switching capability just to equal the channel selection presently available on cable TV. While optical fibers, laser diodes and photodiodes have more than adequate capability for bandwidths in excess of 565 megabits per second, the limiting factor is the unavailability of high speed digital electronics that are required for transmitters, for receivers and for multiplexing and demultiplexing circuits. To compete with conventional cable TV, which can provide 30 or more video channels, a subscriber distribution network based on conventional baseband digital fiber optic transmission must either operate at multigigabit per second data rates, or require extensive video switching capability.

To overcome these difficulties, microwave multiplexing of optical signals has been proposed. In these systems, a wideband microwave signal composed of many frequency multiplexed microwave carriers is used to intensity modulate a high speed laser diode. The optical signal is transmitted through a conventional single mode optical fiber to a remote location. The optical signal received at the remote location is detected with a high speed photodiode, and the transmitted signals are recovered with conventional microwave electronics. The microwave carriers can be modulated by either analog or digital signals and can be used to carry voice, data, video, digital audio, and high definition video, in almost any combination of services. Microwave modulated optical systems can be designed to transmit 1 to 20 gigahertz of bandwidth and can utilize the low-cost equipment presently utilized for satellite video transmission. Transmission of 60 frequency modulated video channels over 18 kilometers of optical fiber is described by R. Olshansky et al in "60-Channel FM Video Subcarrier Multiplexed Optical Communication System," *Electronics Letters*, Vol. 23, No. 22, pages 1196–1198 (Oct. 22, 1987). The transmission of ten FM video channels over 35 kilometers of optical fiber is described by W. I. Way et al in "A 1.3-μm 35-km Fiber-Optic Microwave Multicarrier Transmission System For Satellite Earth Stations," *J. Lightwave Technol.*, Vol. LT- 5, No. 9, September 1987, pages 1325–1332. The transmission of three 44 megabit per second signals over two kilometers of optical fiber is described by T. E. Darcie et al in "Lightwave System Using Microwave Subcarrier Multiplexing," *Electronics Letters*, Vol. 22, No. 15, pages 774–775 (Jul. 17, 1986). An optical local area network utilizing microwave modulation of a light beam is disclosed in U.S. Pat. No. 4,701,904 issued Oct. 20, 1987 to Darcie.

In order to provide a wide range of subscriber services, it is desirable to optimize the information carrying capability of the optical transmission system, while maintaining high quality video transmission and low error rate digital transmission. In addition, it is desirable to increase the number of subscribers which can be connected to a single optical transmitter and to increase the distance over which the subcarrier multiplexed optical signal can be transmitted.

A technique for improving optical receiver sensitivity in comparison with direct detection techniques is to utilize coherent detection. Unlike direct detection where the intensity modulated optical signal is converted directly into a modulated electrical output, the coherent receiver first adds to the received optical signal a locally-generated optical field and detects the squared sum. The resulting photocurrent is translated in frequency from the optical domain to the microwave domain where conventional electronic techniques can be utilized for signal processing. Coherent optical techniques are described by J. Salz in "Modulation and Detection for Coherent Lightwave Communications", *IEEE Communications Magazine*, Vol. 24, No. 6, June 1986, pages 38–49. Multichannel coherent optical systems, wherein a large number of baseband modulated optical carriers are frequency division multiplexed and each carrier is modulated by a single video channel, have been disclosed in the prior art. Single channel coherent systems using baseband modulation are limited in information-carrying capability. Coherent systems having multiple optical carriers have increased information carrying capability but require an optical transmitter for each channel.

It is a general object of the present invention to provide improved optical communication systems.

It is another object of the present invention to provide optical communication systems having the capability of carrying multiple video channels to multiple subscribers over long distances.

It is the further object of the present invention to provide optically coherent subcarrier multiplexed optical communication systems.

SUMMARY OF THE INVENTION

According to the present invention, these and other objects and advantages are achieved in an optical communication system comprising transmitter means including means for generating an optical carrier and means for modulating the optical carrier with a composite electrical modulation signal comprising a plurality of modulated microwave subcarriers to provide an optical signal, receiver means remotely located from the transmitter means and means for coupling the optical signal from the transmitter means to the receiver means. The receiver means includes local oscillator means for generating a local light beam, detector means responsive to the received optical signal and the local light beam for providing a detected signal at an intermediate frequency which carries the composite modulation signal and microwave receiver means responsive to the composite modulation signal from the detector mean for demodulating at least one of the microwave subcarriers from the composite modulation signal.

The detector means typically includes means for adding the received optical signal and the local light beam and providing a sum signal, means for matching the polarization of the received optical signal and the polarization of the local light beam or means for averaging the polarizations through polarization rotation or polarization diversity, and a photodetector responsive to the sum signal. The adding means can comprise a fiber optic coupler, and the local oscillator preferably comprises a narrow linewidth laser.

In a preferred embodiment, the local oscillator laser is tunable over a prescribed range and the microwave receiver means comprises a bandpass filter having a bandwidth corresponding to the bandwidth of one of the modulated microwave subcarriers and a microwave receiver coupled to the bandpass filter. One of the modulated microwave subcarriers is selected by tuning the local oscillator laser such that the selected microwave subcarrier passes through the bandpass filter.

In another embodiment of the invention, the local oscillator laser has a fixed frequency and the microwave receiver means comprises a microwave local oscillator for producing a selectively variable microwave local oscillator frequency, a mixer responsive to the microwave local oscillator frequency and to the intermediate frequency for providing a second intermediate frequency, and a microwave receiver for receiving the second intermediate frequency. In this embodiment, one of the microwave subcarriers is selected by tuning of the microwave local oscillator.

In yet another embodiment of the invention, the local oscillator laser is tunable, and the microwave receiver means includes a tunable microwave local oscillator for producing a variable microwave local oscillator frequency, a mixer responsive to the microwave local oscillator frequency and to the intermediate frequency for providing a second intermediate frequency, and a microwave receiver for receiving the second intermediate frequency. In this embodiment, one of the microwave subcarriers is selected by tuning both the local oscillator laser and the tunable microwave local oscillator, which provide coarse and fine frequency tuning, respectively.

The optical communication system of the invention can be configured as a heterodyne system in which the optical carrier and the local oscillator laser have different frequencies. Alternatively, the system can be a homodyne system in which the optical carrier and the local oscillator laser have the identical frequency and phase. In a homodyne system, the optical carrier and the local oscillator laser are phase locked.

The transmitter means can comprise a transmitter laser for generating the optical carrier and a phase modulator or an intensity modulator responsive to the composite electrical modulation signal for modulating the optical carrier. In an alternate configuration, the transmitter means can comprise a transmitter laser such as a laser diode for generating the optical carrier and means for intensity or frequency modulating the transmitter laser with the composite electrical modulation signal.

For cases where the optical carrier is optically phase modulated and the composite modulation signal has a total bandwidth less than one octave, the optimal value of the modulation index of the optical signal produced by each of the modulated microwave subcarriers is $1.94/[\text{CNR}^{\frac{1}{2}}N^{\frac{1}{2}}]$, where CNR is the carrier to noise ratio and N is the number of microwave subcarriers. For cases where the optical carrier is optically phase modulated and the composite modulation signal has a total bandwidth greater than one octave, the optimal value of the modulation index of the optical signal produced by each of the modulated subcarriers is $[2/(N_2\text{CNR})]^{\frac{1}{2}}$, where $N_2$ is the number of second order intermodulation products in a subcarrier channel and CNR is the carrier-to-noise ratio.

In cases where the bandwidth of the composite modulation signal exceeds one octave, a quadrature detector can be utilized to eliminate second-order intermodulation products. In the quadrature detector, the detected signal from the photodetector is split by a power divider. One output of the divider is coupled to one input of a mixer. The other output of the divider is coupled through a narrowband filter which passes only the intermediate frequency and through a variable delay to the other input of the mixer. In the output of the mixer, second-order intermodulation products are shifted completely out of band.

The quadrature detector described above can also be utilized to eliminate optical phase noise caused by the optical transmitter or the optical local oscillator, or by both. When the variable delay in the quadrature detector is adjusted to approximately zero, the phase noise is cancelled. Thus, lasers which have large amounts of phase noise can be utilized in the coherent subcarrier multiplexed system of the invention.

BRIEF DESCRIPTION OF THE DRAWINGS

For a better understanding of the present invention, together with other and further objects, advantages, and, capabilities thereof, reference is made to the accompanying drawings which are incorporated herein by reference and in which:

FIG. 1 is a block diagram of a subcarrier multiplexed coherent optical communication system in accordance with the present invention;

FIG. 2 is a graphic representation of the optical spectrum for the system shown in FIG. 1;

DETAILED DESCRIPTION OF THE INVENTION

Figure 3A:
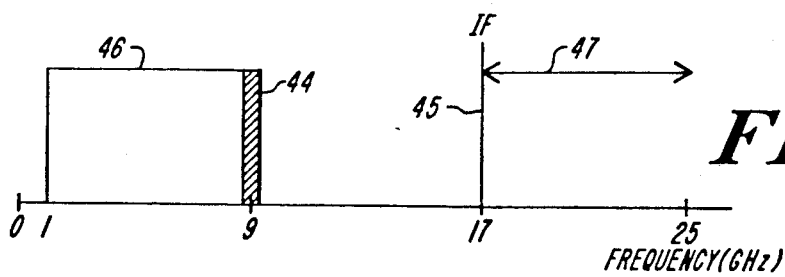
FIGS. 3A-3C are graphic representations of the microwave spectrum for the system shown in FIG. 1 for different tuning positions of the local oscillator laser.

A block diagram of a coherent subcarrier multiplexed optical communication system is shown in FIG. 1. A subcarrier multiplexed optical transmitter 10 receives modulation signals on control lines $12_1$, $12_2$-$12_N$. The modulation signals which can be digital or analog signals, frequency or phase modulate different microwave subcarriers as described hereinafter. The modulated subcarriers are combined to provide a composite modulation signal. The composite modulation signal modulates a light beam, or optical carrier, to provide an optical signal for transmission. The optical signal from transmitter 10 is coupled to one end of a single mode optical fiber 14, which carries the optical signal to a receiver assembly 20. In a typical system, the transmitter 10 and the receiver assembly 20 are remotely located from each other, and signals are coupled between them by the optical fiber 14.

A typical subscriber loop may have many users coupled to an optical fiber. The optical fiber may include optical splitters each having a predetermined signal attenuation. Each user is likely to have both a transmitter and a receiver. The system shown in FIG. 1 illustrates a single transmitter and a single receiver assembly for ease of understanding.

In the receiver assembly 20, a local light beam generated by local oscillator (LO) laser 24 is coupled through a polarization controller 26 to one input of a fiber coupler 28. The received optical signal on optical fiber 14 is coupled to the other input of fiber coupler 28. The laser 24 produces a narrow linewidth light beam which is summed with the received optical signal by fiber coupler 28 to provide a composite optical signal on a line 29. The composite optical signal is coupled to a photodetector 30. The output of photodetector 30 on a line 31 is an intermediate frequency equal to the difference between the carrier frequency of the received optical signal and the frequency of the local light beam. The photodetector 30 is coupled through a low noise amplifier 32 and a bandpass filter 34 to a microwave receiver 36. The laser 24 is tunable over a prescribed frequency range to effect selection of one of the microwave subcarriers in the received optical signal.

The output of amplifier 32 is coupled to the input of polarization control electronics 38, which provides a control signal to polarization controller 26. The polarization controller 26 and the polarization control electronics 38 constitute a control loop which ensures that the received optical signal and the local light beam have the same polarization. Polarization control is described by T. Okoski in *J. Lightwave Technol.*, Vol. LT-35, page 1232, 1985. Alternatively, known techniques for averaging the polarizations through polarization rotation or polarization diversity can be utilized. The output of amplifier 32 is also coupled to the input of frequency control electronics 40, which provides a frequency control signal to laser 24. The frequency control electronics 40 maintains a selected difference, equal to the intermediate frequency, between the optical carrier frequency and the local light beam frequency to eliminate the effects of drift, temperature variations and the like.

The receiver assembly 20 operates as a coherent receiver, since the received optical signal and the local light beam are mixed to provide an intermediate frequency. An example of the optical spectrum of the system is shown in FIG. 2. The carrier for the received optical signal has a typical wave length of 1.3 micrometers. In FIG. 2, the optical signal carrier frequency $f_c$ is arbitrarily selected as the origin of the optical spectrum. The received optical signal in this example includes 200 FM subcarriers 42 in the microwave range between 8 GHz and 16 GHz. The tunable laser 24 produces a light beam having a frequency $f_{LO}$ that can be tuned over a tuning range 43 that differs in frequency from the optical carrier by 17-25 GHz.

Figure 3B:
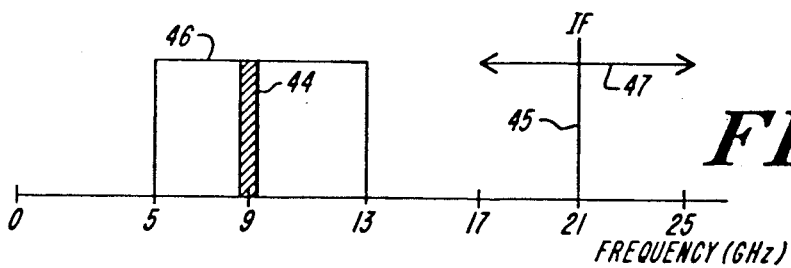
Figure 3C:
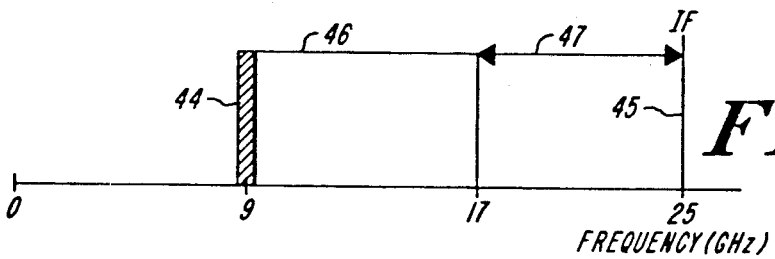

The microwave spectrum of the system for various 24 output frequencies is illustrated in FIGS. 3A-3C. In the present example, the bandpass filter 34 has a spectrum 44 with a center frequency of 9 GHz and a bandwidth of 30 MHz, so that it is capable of selecting one of the subcarrier channels in the received optical signal. In FIG. 3A, the laser 24 is at the lower end of its tuning range, and the intermediate frequency 45 is 17 GHz. In this case, the microwave modulation spectrum 46 extends from 1-9 GHz, and the bandpass filter 34 selects the subcarrier channel at the upper end of the microwave spectrum.

In FIG. 3B, the laser 24 is at the center of its tuning range, and the intermediate frequency 45 is 21 GHz. The microwave modulation spectrum 46 extends from 5-13 GHz, and the subcarrier channel at the center of the microwave spectrum is selected by the bandpass filter 34.

In FIG. 3C, the laser 24 is at the upper end of its tuning range, and the intermediate frequency 45 is 25 GHz. The microwave modulation spectrum 46 extends from 9-17 GHz. In this case, the bandpass filter 34 selects the subcarrier channel at the lower end of the microwave subcarrier spectrum. Thus, any one of the 200 FM subcarrier channels can be selected by appropriate tuning of laser 24. The tuning range of the intermediate frequency 45 is indicated in FIGS. 3A-3C by a line 47.

The receiver configuration shown in FIG. 1 is a heterodyne receiver. The laser 24 is a narrow linewidth laser and is tunable over a prescribed band. In the above example, the intermediate frequency in the range of 17-25 GHz is selected to avoid second order intermodulation products in the signal channel. By placing the minimum intermediate frequency at 17 GHz, no second-order modulation products fall in the passband at 9 GHZ.

In the optical transmitter 10, a phase modulator is driven by an N-channel subcarrier multiplexed composite modulation signal to produce a phase modulation $\phi(t)$ $$\phi(t) = \sum_i \beta_i \cos(2\pi f_i t + \delta_i) \quad (1)$$

where $\beta_i$ is the modulation index for channel i, $f_i$ is the microwave subcarrier frequency, and $\delta_i$ is the FM video signal. The detected signal is given as $$I(t) = 2[I_s I_{lo}]^{\frac{1}{2}} \sin(2\pi f_{IF} t + \phi) \quad (2)$$

where $I_S$ is the DC signal current, $I_{LO}$ is the DC local oscillator current and $\phi$ is the phase modulation of the signal current. The noise is due to shot noise, $2qI_{LO}$, and third-order intermodulation products (IMP's). The IMP's determine the maximum allowed value of the modulation index for each channel and hence the receiver sensitivity. Equation (2) can be approximately expanded as $$I(t) = [I_s I_{lo}]^{\frac{1}{2}} \{\cos(2\pi f_{IF} t)[\phi - \phi^3/6] + \sin(2\pi f_{IF} t)[1 - \phi^2/2]\} \quad (3)$$

Second-order IMP's fall out of the passband and can be ignored. An analysis of the third order IMP's shows that within each subcarrier band, there are a maximum of $3N^2/8$ IMP's of the form $f_i + f_j - f_k$, and the magnitude of each IMP is $\beta^3/6$. The carrier-to-noise ratio (CNR) is thus $$CNR = \{\beta^2 I_s I_{lo}/2\}/\{2qI_{lo}\beta + 3N^2\beta^6 I_s I_{lo}/256\} \quad (4)$$

where the filter bandwidth B is 30 MHz. The optimal value of the modulation index is $$\beta = 1.94/\{CNR^{\frac{1}{4}} N^{\frac{1}{4}}\} \quad (5)$$

The corresponding shot noise limited signal is $$I_s = 1.06q \, B \, N \, CNR^{3/2} \quad (6)$$

Figure 8:
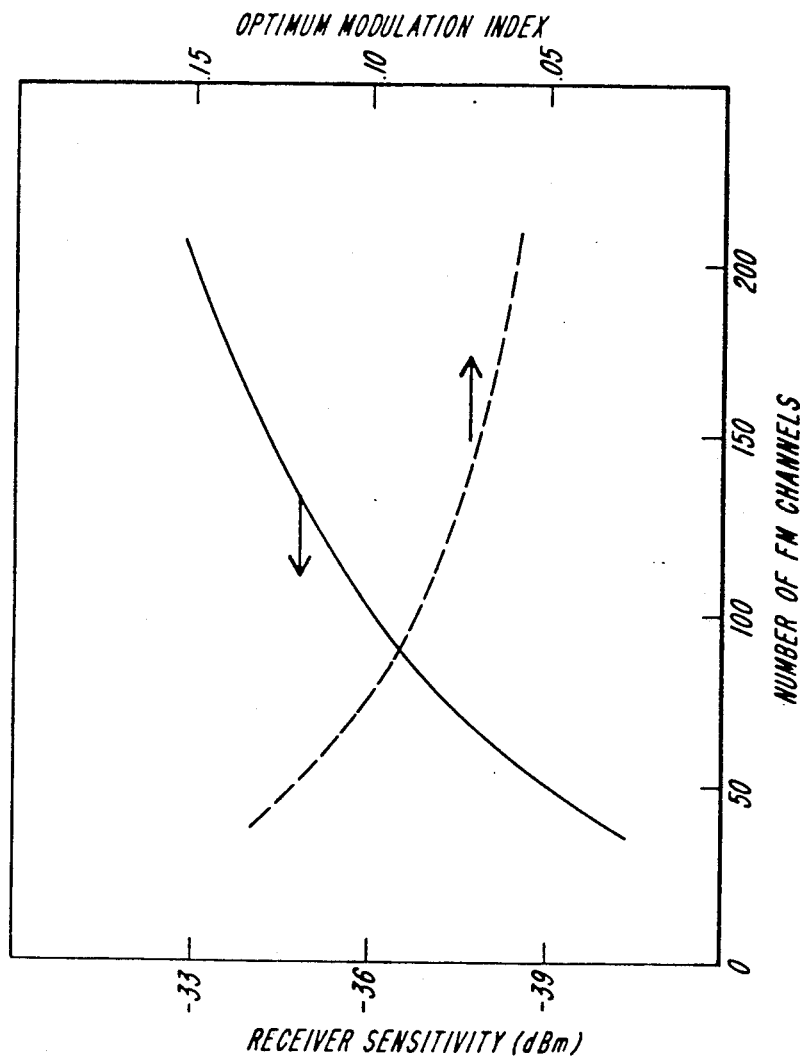
FIG. 8 is a graphic representation of receiver sensitivity and optimum modulation index as a function of the number of subcarrier multiplexed FM channels.

A 16.5 dB CNR is required to achieve a 56 dB weighted baseband video signal-to-noise ratio. For N=200 channels, the modulation index, $\beta$, is 0.053, and the minimum signal current, $I_s$, is 0.30 microamp. Assuming a detector responsivity of 0.7 A/W at 1.3 micrometer, the receiver sensitivity is −34 dBm. A plot of receiver sensitivity and optimal modulation index as a function of the number, N, of FM channels is shown in FIG. 8.

For a 200 channel system, it is reasonable to provide the signal to 128 subscribers. Of the 200 channels, 128 channels can be allocated as dedicated lines for on-demand services, and the remaining 72 channels can be allocated for broadcast services. If a 3.5 dB loss budget is allocated for each stage of passive splitting, then the insertion loss for a 1×128 tree is 24.5 dB. A diode-pumped YAG laser can be operated at 10 milliwatts. Assuming a 6 dB modulator loss, + 4 dBm transmitted power is available. After subtraction of the passive splitting loss there is a remaining 12.5 dB optical link budget. This is sufficient to allow for 5 dB optical link loss, 5 dB margin and a 2.5 dB penalty for deviation from the shot noise limit.

In a preferred embodiment of the receiver assembly 20, the laser 24 is a diode-pumped neodymium YAG laser operating at 1.32 micrometers. The polarization controller 26 is a lithium niobate polarization controller, which utilizes a control loop to detect the polarization of the received optical signal and to vary the polarization of the local light beam supplied by laser 24 to fiber coupler 28. The fiber coupler 28 can be a 2×2 tapered biconic single mode fiber coupler which operates by evanescent coupling of optical waves between adjacent optical fibers. The photodetector 30 can be an InGaAs PIN diode structure wherein the mesa diameter is about 30 micrometers to reduce diode capacitance, and the depletion width is about one micrometer to reduce transit time delays. These photodiode structures produce bandwidths in excess of 15 GHz. The low noise amplifier 32, the bandpass filter 34 and the microwave receiver 36 are conventional microwave components.

Figure 4:
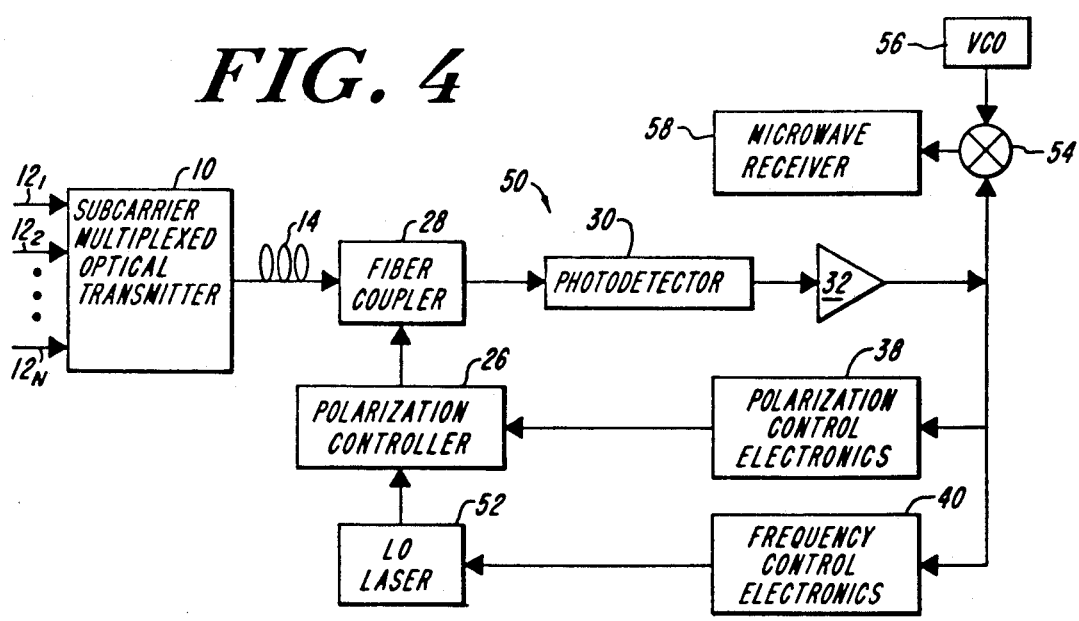
FIG. 4 is a block diagram of a subcarrier multiplexed coherent optical communication system in accordance with another embodiment of the present invention.

Referring now to FIG. 4, there is shown another embodiment of a coherent subcarrier multiplexed optical communication system in accordance with the present invention. Elements that are common with the system of FIG. 1 have the same reference numerals. A receiver assembly 50 includes a fixed local oscillator laser 52. The output of photodetector 30 is supplied through the low noise amplifier 32 to one input of a microwave mixer 54. Polarization control is performed by polarization controller 26 and polarization control electronics 38, and frequency control is performed by frequency control electronics 40 as described hereinabove in connection with FIG. 1.

A tunable local oscillator 56 has its output coupled to the other input of mixer 54. The output of mixer 54 is coupled to the input of a narrowband microwave receiver 58. In the system of FIG. 4, the intermediate frequency at the output of photodetector 30 is a fixed frequency determined by the difference between the optical signal carrier frequency and the local light beam frequency. One of the microwave subcarriers is selected by mixing the intermediate frequency with the output of oscillator 56 to provide a second intermediate frequency, which is supplied to microwave receiver 58.

As described above, the system of FIG. 4 includes a local oscillator laser 52 of fixed wavelength and a tunable local oscillator 56. According to another embodiment of the invention, the system shown in FIG. 4 is implemented with a tunable local oscillator laser 52 and a tunable microwave local oscillator 56 to achieve selection of the desired microwave subcarrier. The frequency of local oscillator laser 52 is tuned by frequency control electronics 40. The local oscillator laser 52 can be tuned over many tens of gigahertz, and the microwave local oscillator 56 can be tuned over hundreds of megahertz or a few gigahertz. The combined use of local oscillator laser 52 and microwave local oscillator 56 for coarse and fine frequency tuning, respectively, provides selection of the desired microwave subcarrier over a very broad frequency range.

Figure 5:
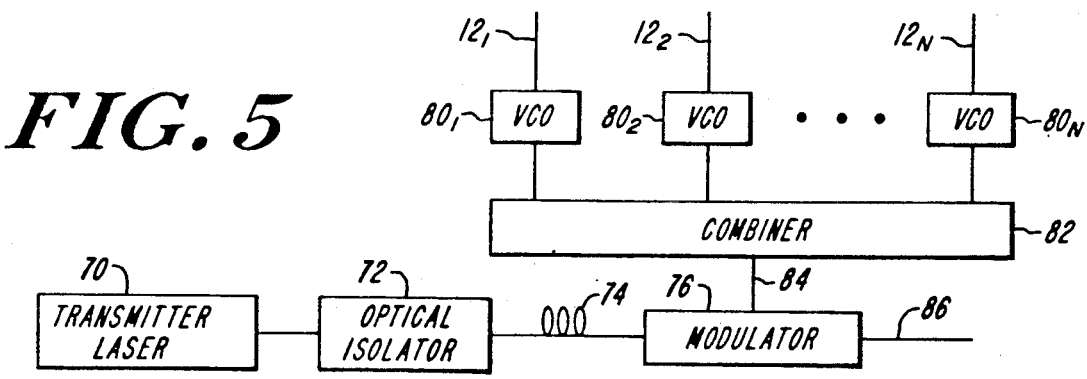
FIG. 5 is a block diagram of one embodiment of the subcarrier multiplexed optical transmitter of FIG. 1.

A block diagram of a preferred embodiment of the optical transmitter 10 is shown in FIG. 5. A transmitter laser 70 generates a narrow linewidth light beam. The light beam is coupled through an optical isolator 72 and an optical fiber 74 to a modulator 76. The optical isolator 72 isolates the laser 70 from reflections. A plurality of voltage controlled oscillators $80_1$, $80_2$–$80_N$ produce outputs in the microwave frequency range at frequencies $f_1$, $f_2$–$f_N$ respectively. Typically, the frequencies $f_1$, $f_2$–$f_N$ are in a frequency range between about 1 and 20 GHz. The spacing between adjacent frequencies is adequate to accommodate the expected signal bandwidths. The voltage controlled oscillators $80_1$, $80_2$–$80_N$ are modulated by the signals on control lines $12_1$, $12_2$–$12_N$, respectively. The modulation signals on the control lines produce frequency or phase variations in the outputs of the voltage controlled oscillators.

A microwave combiner 82 combines the microwave subcarriers at the outputs of voltage controlled oscillators $80_1$, $80_2$–$80_N$ to produce a composite microwave signal on an output line 84. The composite microwave signal on output line 84 is coupled to modulator 76 and modulates the light beam from transmitter laser 70 to provide a subcarrier multiplexed optical signal at the output 86 of modulator 76. In one embodiment, the modulator 76 is a phase modulator which phase modulates the optical carrier from transmitter laser 70 to provide a phase modulated subcarrier multiplexed optical signal. In an alternative embodiment, the modulator 76 is an intensity modulator which produces an intensity modulated subcarrier multiplexed optical signal. The term "subcarrier multiplexed" refers to the fact that the primary carrier frequency is the optical signal at about $10^{14}$ Hz, while the microwave signals at $10^9$–$10^{10}$ Hz are the modulated subcarriers. The phase modulator output 86 is coupled to optical fiber 14 for transmission, as shown in FIGS. 1 and 4.

By way of example, the transmitter laser 70 can be a 20 KHz linewidth, 1.3 micrometer diode pumped neodymium YAG laser. The optical isolator 72 can be a made from yttrium garnet. The modulator 76 can be a wideband lithium niobate or gallium arsenide phase modulator. The voltage controlled oscillators $80_1$, $80_2$, –$80_N$ can be, for example, be stable, narrowband oscillators, and the combiner 82 can be a conventional $1 \times N$ power combiner.

Figure 6:
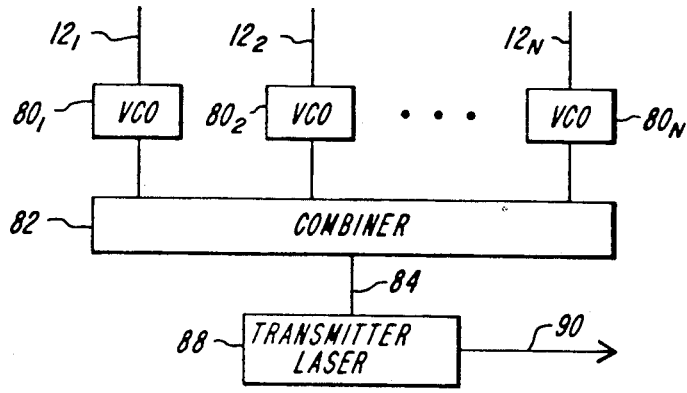
FIG. 6 is a block diagram of another embodiment of the subcarrier multiplexed optical transmitter of FIG. 1.

An alternate embodiment of the optical transmitter 10 is shown in FIG. 6. The voltage controlled oscillators $80_1$, $80_2$–$80_N$ and the microwave combiner 82 produce a composite modulation signal on output line 84 in the same manner described hereinabove in connection with FIG. 5. The composite modulation signal is coupled to a transmitter laser 88, which is typically a laser diode. The transmitter laser 88 produces a light beam that is intensity or frequency modulated by the composite modulation signal to provide a subcarrier multiplexed optical signal on an output 90. The laser output 90 is coupled to optical fiber 14 for transmission.

In a preferred embodiment, the transmitter laser 88 is a high frequency vapor-phase regrown buried heterojunction InGaAsP laser emitting a spectral range of 1.3 to 1.6 micrometers. The laser has a very simple mesa geometry which reduces the parasitic capacitance due to PN junctions and results in extremely good high speed performance. These devices have a typical small signal modulation bandwidth of 11 GHz at a DC bias of 5 milliwatts.

In an example of the present invention, five channels of 100 megabits each were transmitted using frequency shift keying as the modulation format. The system had the configuration shown in FIGS. 1 and 5. The transmitter laser 70 and the local oscillator laser 24 were compact, diode-pumped neodymium YAG ring lasers from Lightwave Electronics operating at a wavelength of 1.32 micrometers with a combined linewidth of 25 KHz and a tuning range of approximately 50 GHz. The optical isolator 72 provided over 35 dB isolation from reflections. The modulator 76 was a fiber pigtailed lithium niobate phase modulator. The 5 FSK channels were at frequencies of 2.1, 2.5, 2.9, 3.3 and 3.7 GHz.

In the receiver assembly, the photodetector 30 was a PIN photodiode and the bandpass filter 34 had a bandwidth of 120 MHz centered at 6.5 GHz. Channel selection was performed by tuning the local oscillator laser 24 such that the desired channel fell within the passband of filter 34. The signal was then downconverted to 1.5 GHz with a double balanced mixer and was demodulated using a delay line discriminator. No optical isolator was used with the laser 24.

Figure 7:
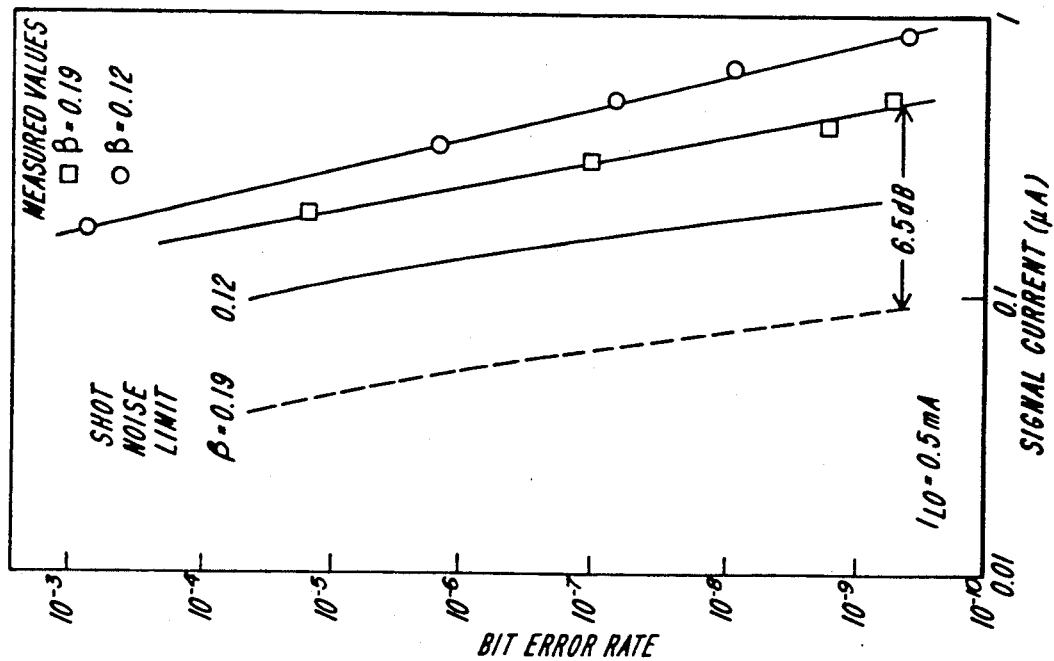
FIG. 7 is a graphic representation of measured bit error rate and bit error rate at the shot noise limit as a function of signal current for a five channel subcarrier multiplexed coherent optical communication system.

The results of the system test are shown in FIG. 7. The measured bit error rate and the calculated bit error rate at the shot noise limit are plotted as a function of signal current. The measurements were made with a local oscillator laser photocurrent 0.5 milliamp. It is seen that the receiver sensitivity improves with increasing modulation index and that there is a 6.5 dB power penalty with respect to the shot noise limit at a bit error rate of $10^{-9}$. The penalty is due largely to the thermal noise resulting from insufficient local oscillator power, non ideal electronics and polarization mismatch. With a modulation index of 0.19 for each channel, a bit error rate of $10^{-9}$ was achieved with a total DC signal photocurrent of 0.5 microamp. The system exhibited a 14 dB improvement in receiver sensitivity over a direct detection FSK subcarrier multiplexed system.

Thus far, the coherent subcarrier multiplexed optical communication system of the present invention has been described in connection heterodyne systems in which the frequency of the local oscillator laser is different from the frequency of the optical signal carrier. In this case, an intermediate frequency equal to the difference between the optical carrier frequency and the local oscillator frequency is produced. In another embodiment of the invention, the coherent receiver is configured as a homodyne system in which the optical carrier and the local oscillator have the identical frequency and phase, and the intermediate frequency is zero. In a homodyne system, it is necessary to synchronize the phases of the local oscillator and the optical carrier. Phase locking can be achieved using known phase locked loop techniques.

In the 200 channel system described hereinabove, the composite modulation signal occupied a total bandwidth of less than one octave, and second order intermodulation products were outside the modulation band. For a system in which the composite microwave modulation signal occupies more than one octave of bandwidth, second-order intermodulation products dominate third-order intermodulation products. Assume there are $N_2$ second order IMP's in a given subcarrier channel. The carrier to noise ratio CNR is given by $$CNR = \{\beta^2 I_s I_{lo}/2\} / \{2q\, I_{lo}B + N_2 \beta^4 I_s I_{lo}/8\} \quad (7)$$

where the filter bandwidth is B. The optimal value of the modulation index, $\beta$, is $$\beta = [2/(N_2 CNR)]^{\frac{1}{4}} \quad (8)$$

and the corresponding shot noise limited signal current, $I_s$, is $$I_s = 2q\, B\, N\, CNR^2 \quad (9)$$

As an example, consider a 200 channel FM video system, a 16.5 dB CNR is required to achieve a 56 dB weighted baseband video signal-to-noise ratio. For $N_2 = 100$, the optimal value of modulation index is 0.021, and the minimum signal is 1.9 microamps. Assuming a detector responsivity of 0.7 A/W at 1.3 micrometers, the receiver sensitivity is −27 dBm.

In the calculations of modulation index hereinabove, the optical carrier is optically phase modulated. For cases where the optical carrier is intensity modulated, the optimum modulation index is given by $2.66/(N^{\frac{1}{2}}CNR^{\frac{1}{4}})$.

A technique for eliminating second order intermodulation products will now be described with reference to FIG. 9. The detected signal in a coherent subcarrier multiplexed receiver is given by equation (2) hereinabove. A power series expansion of the received signal is given by equation (3) where $\phi$ represents the signal, $\phi^2$ represents second-order IMP's, and $\phi^3$ represents third order IMP's. The second order IMP is in phase quadrature with the signal. By multiplying the detected signal I(t) by cos $(2\pi f_{IF} t)$, the second order terms are eliminated as follows $$I(t) \phi = 2[I_s I_0]^{\frac{1}{2}}\{\frac{1}{2}[\phi - \phi^3/6] + \text{terms at frequency } 2f_{IF}\} \quad (10)$$

The signal, $\phi$, can be recovered, and the second order IMP's are shifted to a center frequency of $2f_{IF}$. Since the intermediate frequency can be 10-15 GHz, the second-order IMP's are shifted completely out of band.

Figure 9:
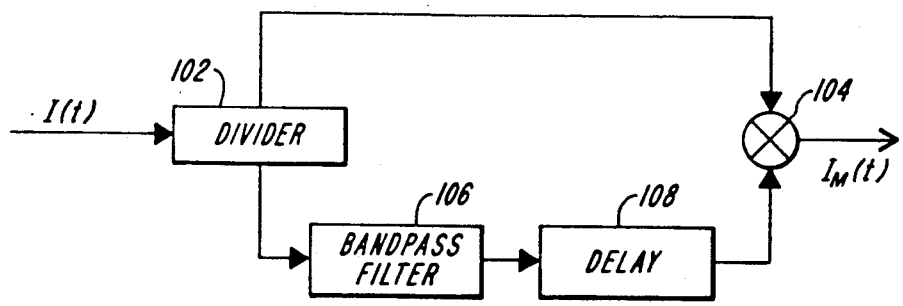
FIG. 9 is a block diagram of a receiver configuration for elimination of second-order intermodulation products and for cancellation of optical phase noise.

A circuit for quadrature elimination of second-order IMP's is shown in block diagram form in FIG. 9. The circuit of FIG. 9 can be inserted into the system of FIG. 1 between the amplifier 32 and the bandpass filter 34, and can be inserted into the system of FIG. 4 between the amplifier 32 and the mixer 54. The detected signal I(t) is split by a power divider 102. One output of divider 102 is coupled to one input of a mixer 104. The other output of divider 102 is coupled to a narrowband filter 106 which passes only $f_{IF}$. The output of filter 106 is coupled through a variable delay 108 to the other input of mixer 104. The output of mixer 104 is given by $$I_m = I(t) \cos (2\pi f_{IF} t + \eta), \eta = n\pi \quad (11)$$

where $\eta$ is a phase delay that is adjusted to $n\pi$ with the variable delay 108. The mixer output, $I_M$, provides quadrature detection and elimination of second-order intermodulation products.

The circuit shown in FIG. 9 can also be used for cancellation of phase noise caused by the optical transmitter or the optical local oscillator, or by both. In the presence of optical phase noise, the detected signal I(t) is given as $$I(t) = 2[I_s I_0]^{\frac{1}{2}} \sin [2\pi f_{IF} t + \phi + \delta\phi(t)] \quad (12)$$

where $\delta\phi(t)$ is the phase noise. After passing through the bandpass filter 106 and the delay 108, the signal in the lower branch of the circuit shown in FIG. 9 has the form $$I_1(t) = I_1 \sin[2\pi f_{IF}(t+\tau) + \delta\phi(t+\tau)] \quad (13)$$

where $I_1(t)$ represents the signal at the output of delay 108 and $\tau$ is the delay of the lower IF branch relative to the upper signal branch of the circuit shown in FIG. 9. After combination by mixer 104, the output signal $I_2(t)$ is given as $$I_2(t) = I_2 \sin[2\pi f_{IF}\tau - \phi + \delta\phi(t+\tau) - \delta\phi(t)] \quad (14)$$

When the delay $\tau$ is adjusted to be approximately zero, the detected signal $I_2(t)$ becomes $$I_2(t) = -I_2 \sin [\phi] \quad (15)$$

and the phase noise is cancelled. This technique permits coherent subcarrier multiplexed systems to be built using single frequency lasers, such as distributed feedback lasers, which have large amounts of phase noise.

While there have been shown and described what are at present considered the preferred embodiments of the present invention, it will be obvious to those skilled in the art that various changes and modifications may be made therein without departing from the scope of the invention as defined by the appended claims.

What is claimed is:

1. An optical communication system comprising:
    transmitter means including means for generating an optical carrier and means for modulating the optical carrier with a composite modulation signal comprising a plurality of modulated microwave subcarriers to provide an optical signal; and
    receiver means remotely located from said transmitter means and means for coupling said optical signal from said transmitter means to said receiver means, said receiver means including
        local oscillator means for generating a local light beam, said local oscillator means being tunable over a prescribed frequency range,
        detector means responsive to the received optical signal and said local light beam for providing a detected signal at an intermediate frequency which carries said composite modulation signal, and
        microwave receiver means responsive to the composite modulation signal from said detector means for demodulating at least one of said microwave subcarriers from said composite modulation signal, said microwave receiver means comprising a microwave local oscillator for producing a selectively variable microwave local oscillator frequency, a mixer responsive to said microwave local oscillator frequency and to said detected signal for providing a second intermediate frequency, and a microwave receiver for receiving said second intermediate frequency, said local oscillator means and said microwave local oscillator together permitting selection of a desired microwave subcarrier.

2. An optical communication system as defined in claim 1 wherein said detector means includes
    means for adding the received optical signal and said local light beam and and providing a sum signal, and
    a photodetector responsive to the sum signal.

3. An optical communication system as defined in claim 2 wherein said adding means comprises a fiber optic coupler.

4. An optical communication system as defined in claim 1 wherein said local oscillator means includes a narrow linewidth laser.

5. An optical communication system comprising:
    transmitter means including means for generating an optical carrier and means for modulating the optical carrier with a composite modulation signal comprising a plurality of modulated microwave subcarriers to provide an optical signal; and receiver means remotely located from said transmitter means and means for coupling said optical signal from said transmitter means to said receiver means, said receiver means including local oscillator means for generating a local light beam, detector means responsive to the received optical signal and said local light beam for providing a detected signal at an intermediate frequency which carries said composite modulation signal, microwave receiver means responsive to the composite modulation signal from said detector means for demodulating at least one of said microwave subcarriers from said composite modulation signal, and means for mixing said detected signal with an in-phase component of the intermediate frequency to provide a signal that is free of optical phase noise.

6. An optical communication system as defined in claim 5 wherein said means for mixing comprises means for dividing said detected signal into a first component and a second component, a narrowband filter at said intermediate frequency and responsive to said first component, delay means responsive to the output of said narrowband filter, and a mixer responsive to said second component and to the output of said delay means for providing said signal that is free of optical phase noise.

* * * * *